United States Patent [19]
Gotoh

[11] Patent Number: 5,227,688
[45] Date of Patent: Jul. 13, 1993

[54] BRUSH HOLDER FOR VEHICULAR A.C. GENERATOR

[75] Inventor: Hitoshi Gotoh, Hyogo, Japan

[73] Assignee: Mitsubishi Denki K. K., Tokyo, Japan

[21] Appl. No.: 921,398

[22] Filed: Jul. 30, 1992

Related U.S. Application Data

[63] Continuation of Ser. No. 755,377, Sep. 5, 1991, abandoned.

Foreign Application Priority Data

Sep. 27, 1990 [JP] Japan .................... 2-260190

[51] Int. Cl.⁵ .................................... H02K 13/00
[52] U.S. Cl. ........................ 310/239; 310/42; 310/43; 310/247; 310/248
[58] Field of Search ............... 310/239-242, 310/, 244-249, 42, 43

[56] References Cited

U.S. PATENT DOCUMENTS

| | | | |
|---|---|---|---|
| 1,695,865 | 12/1928 | Specht | 310/239 |
| 1,948,268 | 2/1934 | Kitto | 310/239 |
| 1,970,604 | 8/1934 | Henry | 310/239 |
| 2,045,293 | 6/1936 | Carlson | 310/239 |
| 2,748,302 | 5/1956 | Boeckel | 310/247 |
| 2,773,209 | 12/1959 | Kirkwood | 310/247 |
| 3,731,126 | 5/1973 | Hagenlocher | 310/239 |
| 3,735,172 | 5/1973 | Battaglia | 310/242 |
| 3,919,574 | 11/1975 | Schmuck | 310/239 |
| 3,955,113 | 5/1976 | Hillyer et al. | |
| 4,504,752 | 3/1985 | Iwaki | 310/43 |
| 4,554,476 | 11/1985 | Gotoh | |
| 4,590,398 | 5/1986 | Nagamatsu | 310/239 |
| 4,800,312 | 1/1989 | Wacek | 310/239 |
| 4,835,432 | 5/1989 | DePasquale | 310/242 |

FOREIGN PATENT DOCUMENTS

| | | | |
|---|---|---|---|
| 0044113 | 1/1982 | European Pat. Off. | |
| 533226 | 9/1956 | Fed. Rep. of Germany | 310/247 |
| 7513844 | 4/1975 | Fed. Rep. of Germany | |
| 3432460 | 3/1986 | Fed. Rep. of Germany | 310/239 |
| 3627529 | 2/1988 | Fed. Rep. of Germany | |
| 2257162 | 8/1975 | France | |
| 2410381 | 6/1979 | France | |
| 0732470 | 6/1955 | United Kingdom | 310/247 |

*Primary Examiner*—R. Skudy
*Attorney, Agent, or Firm*—Sughrue, Mion, Zinn, Macpeak & Seas

[57] ABSTRACT

A brush holder for a vehicular a.c. generator is characterized by stealth grooves for letting a compression spring escape, the stealth grooves being provided longitudinally in a portion excluding the lower portion of a brush box, the stealth grooves being provided in both respective inner walls of a square hole of the brush box where a brush contacts the inner walls thereof.

2 Claims, 3 Drawing Sheets

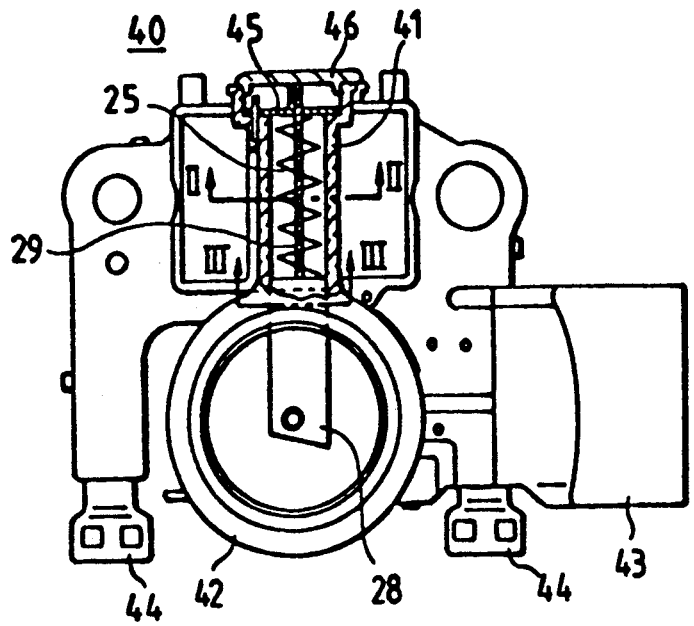
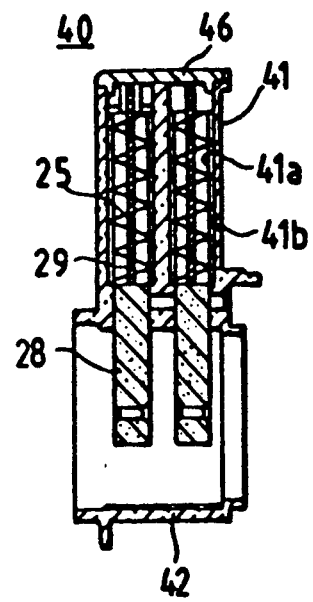
FIG. 1(a)  FIG. 1(b)
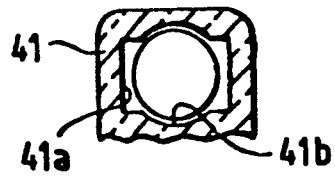
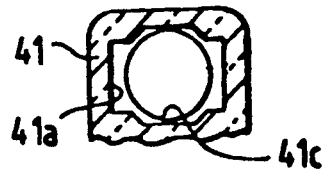
FIG. 2  FIG. 4
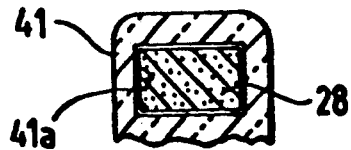
FIG. 3

PRIOR ART
FIG. 6(a)
PRIOR ART
FIG. 6(b)
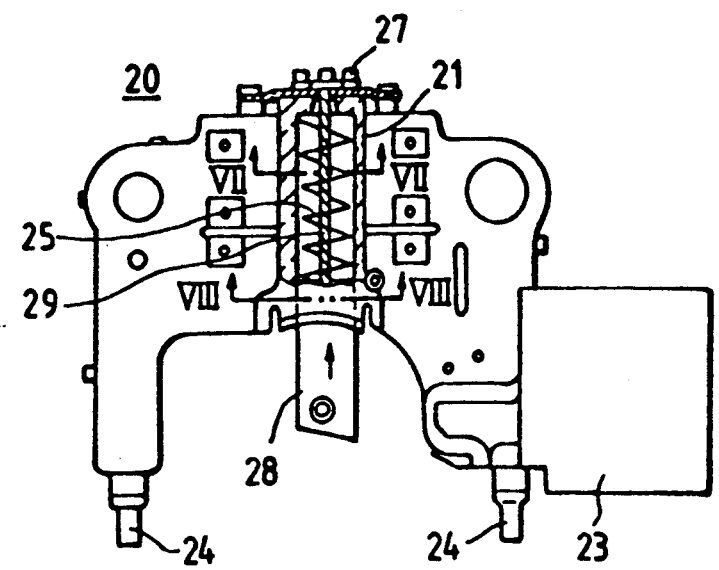
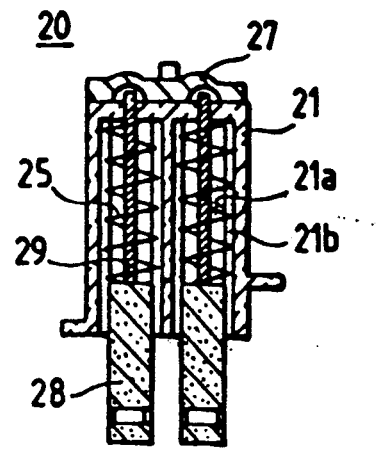
PRIOR ART
FIG. 7
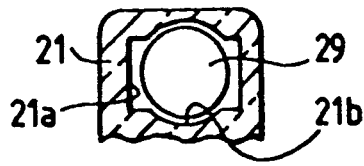
PRIOR ART
FIG. 9
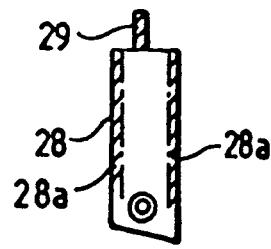
PRIOR ART
FIG. 8
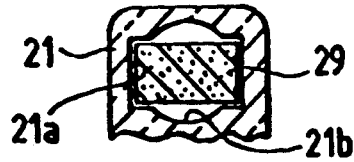

BRUSH HOLDER FOR VEHICULAR A.C. GENERATOR

This is a continuation of application Ser. No. 07/755,377 filed Sep. 5, 1991, now abandoned.

BACKGROUND OF THE INVENTION

1. Field of the Invention

The present invention relates generally to brush holders for vehicular a.c. generators and more particularly to a brush holder having a brush box for holding brushes therein and compression springs for respectively urging the brushes.

2. Description of the Prior Art

FIG. 5 is a sectional view of a vehicular a.c. generator fitted with a brush holder. As shown in FIG. 5, the a.c. generator comprises a stator 1 formed of a stator core 2 and a stator coil 3, a rotor 4 formed of heteropolar magnetic cores 5, 6, the magnetic tooth portions of both being alternately projected in the circumferential direction, an exciting coil 7 held between the magnetic coils 5, 6, a rotary shaft 8 for securing the magnetic cores 5, 6, a pair of slip rings 9 held by the rotary shaft 8, and fans 10, 11 respectively held by the magnetic cores 5, 6.

The generator further includes a front and a rear bracket 12, 13 for fixing the stator core 2 by means of a clamping bolt 14, bearings 15, 16 for supporting the rotary shaft 8 respectively on the front and the rear bracket 12, 13, a pulley 17 fixed to the rotary shaft 8 and used for transmitting torque to the rotary shaft 8 in order to rotate the rotor 4.

The generator further includes a rectifier 18 for rectifying a.c. current resulting from the a.c. voltage induced in the stator coil 3.

The generator further includes a voltage regulator 19 for detecting the generator voltage, controlling exciting current, and adjusting terminal voltage to a predetermined value.

The generator further includes a brush holder 20 fixed to the rear bracket 13 and used for longitudinally movably urging and holding brushes 28, and a partition ring 22 fixed to the rear bracket 13 in such a way as to screen the generator from injurious materials such as atmospheric moisture having a salt content, and the like, by covering the outer circumference of the slip rings 9, with a space provided therebetween.

FIG. 6(a) and 6(b) are a partial cutaway elevational view and a side sectional view of a conventional brush holder fitted to the vehicular a.c. generator described above. In this case, the brush holder is in such a state that it has been removed from the a.c. generator. The brush holder 20 comprises a brush box 21 made of synthetic resin, the brushes 28 being inserted therein, a connector unit 23, a terminal unit 24, compression springs 25 for urging the respective brushes 28, a cover 27 made of synthetic resin, and connecting leads 29 connected to the respective brushes 28.

The inner wall of a square hole 21a of the brush box 21 is formed as shown in FIG. 7 and FIG. 8 which are sectional views taken on lines VII—VII and VIII—VIII, respectively. Stealth grooves 21b in the form of a split circle are longitudinally provided over the whole length of the inner wall of the square hole toward the thickness of the brush 28 so as not to restrict the compression spring 25.

As shown in FIG. 9, the brush 28 inserted in the brush box 21 is disposed so that only contact surfaces 28a as shown by hatching in both side portions of the brush toward the thickness thereof are made to slidably contact the inner walls of the brush box 21.

In the brush holder 20 for the conventional vehicular a.c. generator described above, the stealth grooves 21b are longitudinally made over the whole length of the inner wall of the square hole 21a of brush box 21 toward the thickness of the brush 28. Consequently, only the small contact surfaces 28a in the side portions of the brush 28 are caused to slidably contact the remaining inner wall of the brush box 21. As a result, it becomes a serious problem that the contact surfaces 28a of the brush 28 tend to excessively wear because of the vertical movement of the slip ring 9 caused by vibration, thus resulting in poor contact with the slip ring as the brush shakes and tilts.

SUMMARY OF THE INVENTION

An object of the present invention is to solve the foregoing problems by providing a brush holder for a vehicular a.c. generator in which the above-mentioned small contact surfaces are avoided and a larger surface of the brush contents the respective inner walls of a brush box, in order to reduce the wear of the side portions and to maintain a smooth contact between these portions and a slip ring.

The brush holder for a vehicular a.c. generator according to the present invention is provided with stealth grooves for letting a compression spring escape. The stealth grooves are formed longitudinally, in a portion excluding the lower portion of a brush box, in inner walls of a square hole of the brush box which are in contact with a brush.

According to the present invention, the side portions of the brush slidably contact a upper portion of the respective inner walls of the brush box that does not have stealth grooves formed therein. Accordingly, the whole surface in the side portions thereof slidably contacts the inner walls thereof, thus preventing the side portions of the brush from wearing away and inhibiting the brush from shaking and tilting in the brush box.

BRIEF DESCRIPTION OF THE DRAWINGS

FIGS. 1(a) and 1(b) are a partial cutaway elevational view and a side sectional view of a brush holder for a vehicular a.c. generator according to a first embodiment of the present invention;

FIG. 2 is a sectional view taken on line II—II of FIG. 1(a);

FIG. 3 is a sectional view taken on line III—III of FIG. 1(a);

FIG. 4 is a sectional view of another brush holder according to a second embodiment of the present invention;

FIGS. 6(a) and 6(b) are a partial cutaway elevational view and a side sectional view of a conventional brush holder for a vehicular a.c. generator;

FIG. 7 is a sectional view taken on line VII—VII of FIG. 6(a);

FIG. 8 is a sectional view taken on line VIII—VIII of FIG. 6(a); and

FIG. 9 is an elevational view of side contact surfaces of the brush of FIG. 6(a).

DETAILED DESCRIPTION OF THE PREFERRED EMBODIMENTS

Figure 5:
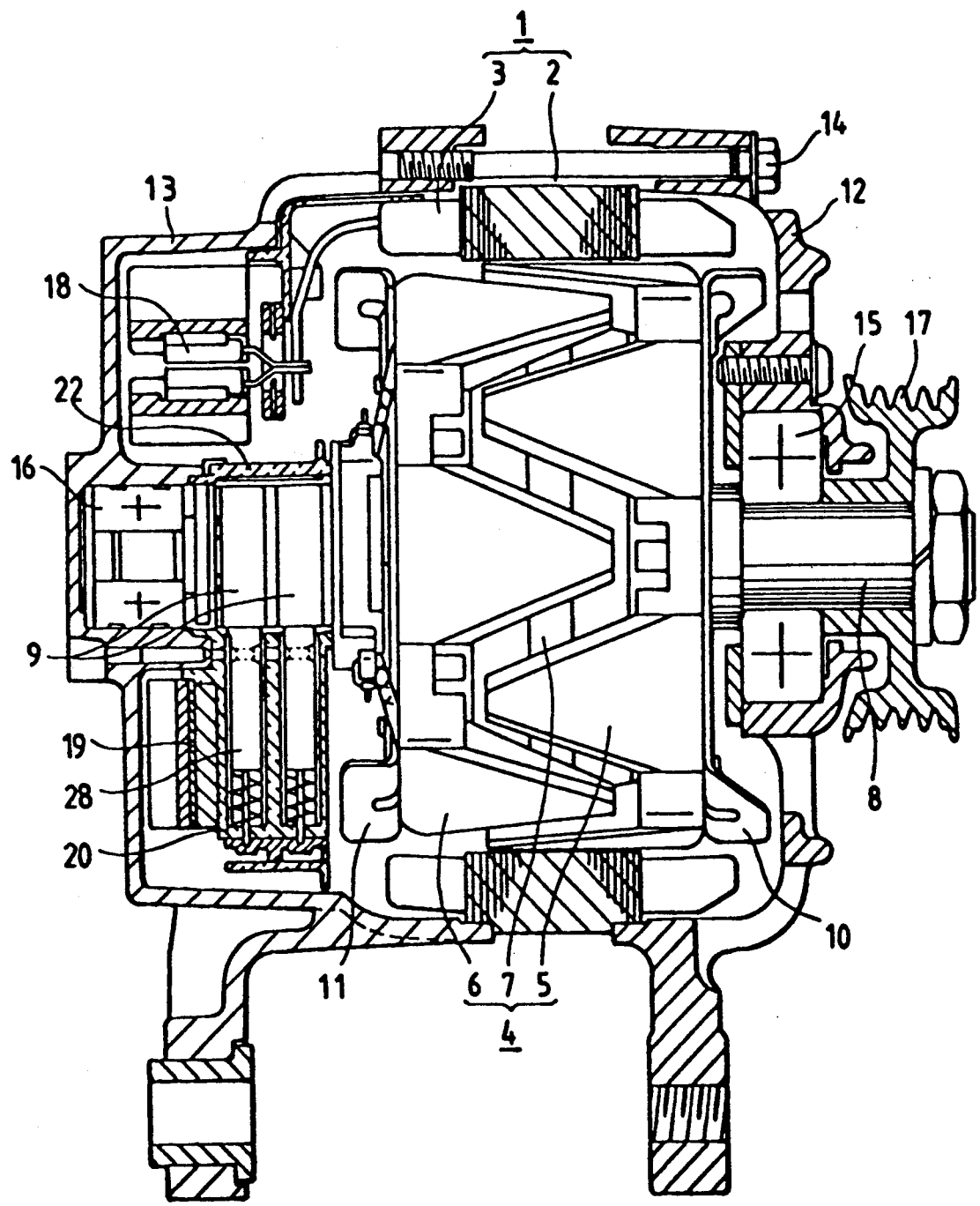
FIG. 5 is a vertical sectional view of a vehicular a.c. generator.

FIGS. 1(a) and 1(b) are a partial cutaway elevational view, respectively, and a side sectional view of a brush holder for a vehicular a.c. generator according to a first preferred embodiment the present invention, the brush holder being fitted to the a.c. generator shown in FIG. 5. As shown in the drawings, a brush holder 40 is integrally formed with a brush box 41 made of synthetic resin and a partition ring 42. The brush holder is also provided with a connector unit 43 and a terminal unit 44. A metal terminal plate 45 has one end of the connecting lead 29 of a brush 28 connected thereto and is fixed to the brush box 41. The metal terminal plate 45 also functions as a stopper for compression springs 25. A cover 46 is fitted to the top of the brush box 41 for protection.

The inner wall of the square hole 41a of the brush box 41 is formed so that its upper portion in the vertical direction has a sectional configuration taken on line II—II of FIG. 1(a) as shown in FIG. 2. Stealth grooves 41b in the form of a split circle for letting the compression spring 25 escape are provided in both respective inner walls at an upper portion of brush box 41, within the extension range of the compression spring 25 when the brush 28 reaches the limit of wear.

The lower portions of inner walls of the square hole 41a of the brush box 41 are formed so that the square hole has a rectangular sectional configuration taken on line III—III of FIG. 1(a) as shown in FIG. 3. No stealth grooves 41b are provided in the lower portions of inner wall of the brush box 41 and the whole side portion of the brush 28 which is of rectangular cross-section, is thus slidably in contact with the inner walls of the square hole. As the whole surface of the brush 28 is allowed to contact the inner walls of the square hole of the brush box 41, concentrated local wear of side portions thereof is thus prevented.

FIG. 4 shows another embodiment of the present invention in which trapezoidal stealth grooves 41c are provided in a sectional view corresponding to that of FIG. 2.

As set forth above, the stealth grooves for allowing escape of the compression spring of the brush are provided in both inner walls of the square hole of the brush box of the brush holder at upper portions of the brush box. The contact surface of the brush is thus increased as compared with conventional brush holders. As a result, the brush is inhibited from shaking and tilting in the brush box so as to ensure that it maintains a smooth contact with the slip ring.

What is claimed is:

1. A brush holder for a vehicular A.C. generator, comprising:
   a brush box having a hole formed therein, said hole being substantially rectangular in cross section over its entire length, said brush box being integrally formed from a synthetic resin is inserted;
   a brush, at least a portion of said brush being disposed in a lower portion of said hole, said brush being rectangular in cross section so as to be in slidable contact with walls which define said hole over an entire surface area of said portion of said brush which is disposed in said lower portion of said hole;
   a spring disposed in an upper portion of said hole so as to bias said brush in a first direction; and
   a stealth groove formed in each of an opposite pair of said walls of said hole so as allow said spring to freely compress and expand therein, said stealth grooves extending only along said upper portion of said hole in a direction of a longitudinal axis of said hole, said stealth grooves being trapezoidal in cross section.

2. A brush holder as claimed in claim 1, wherein said opposite pair of said walls correspond to a length of a rectangular defined by a cross section of a lower portion of said hole.

* * * * *